United States Patent [19]

Graffin

[11] Patent Number: 5,515,888
[45] Date of Patent: May 14, 1996

[54] MEASURING WEIGHT BY INTEGRATING FLOW

[76] Inventor: André Graffin, La Tasse d'en Bas, 72405 La Chapelle du Bois, France

[21] Appl. No.: 328,700

[22] Filed: Oct. 25, 1994

[30] Foreign Application Priority Data

Oct. 29, 1993 [FR] France ..................... 93 12955

[51] Int. Cl.⁶ ................. B65B 1/04; B65B 3/04
[52] U.S. Cl. ................. 141/1; 141/83; 141/128; 141/192; 141/198; 177/122
[58] Field of Search ................. 141/1, 13, 83, 141/95, 104, 128, 192, 198; 177/50, 122

[56] References Cited

U.S. PATENT DOCUMENTS

| | | | |
|---|---|---|---|
| 4,211,263 | 7/1980 | Kennedy et al. | 141/83 |
| 4,676,282 | 6/1987 | Bellini et al. | 141/1 |
| 4,856,563 | 8/1989 | yamaguchi et al. | 141/83 |
| 5,148,841 | 2/1992 | Graffin | 141/83 |
| 5,287,896 | 2/1994 | Graffin | 141/9 |

FOREIGN PATENT DOCUMENTS

| | | |
|---|---|---|
| 0406092 | 6/1990 | European Pat. Off. |
| 0524850 | 7/1992 | European Pat. Off. |

Primary Examiner—Henry J. Recla
Assistant Examiner—Timothy L. Maust
Attorney, Agent, or Firm—Griffin, Butler, Whisenhunt & Kurtossy

[57] ABSTRACT

The method comprises the steps of:
  controlling the flow of substance by means of the filler member;
  measuring, over successive time intervals, the instantaneous flow rate of substance filled into the receptacle;
  calculating the total weight of substance filled into the receptacle on the basis of the instantaneous flow rate over each time interval; and
  causing the flow of substance to stop when the calculated total weight reaches the reference net weight minus a tail-back weight for the substance.

7 Claims, 1 Drawing Sheet

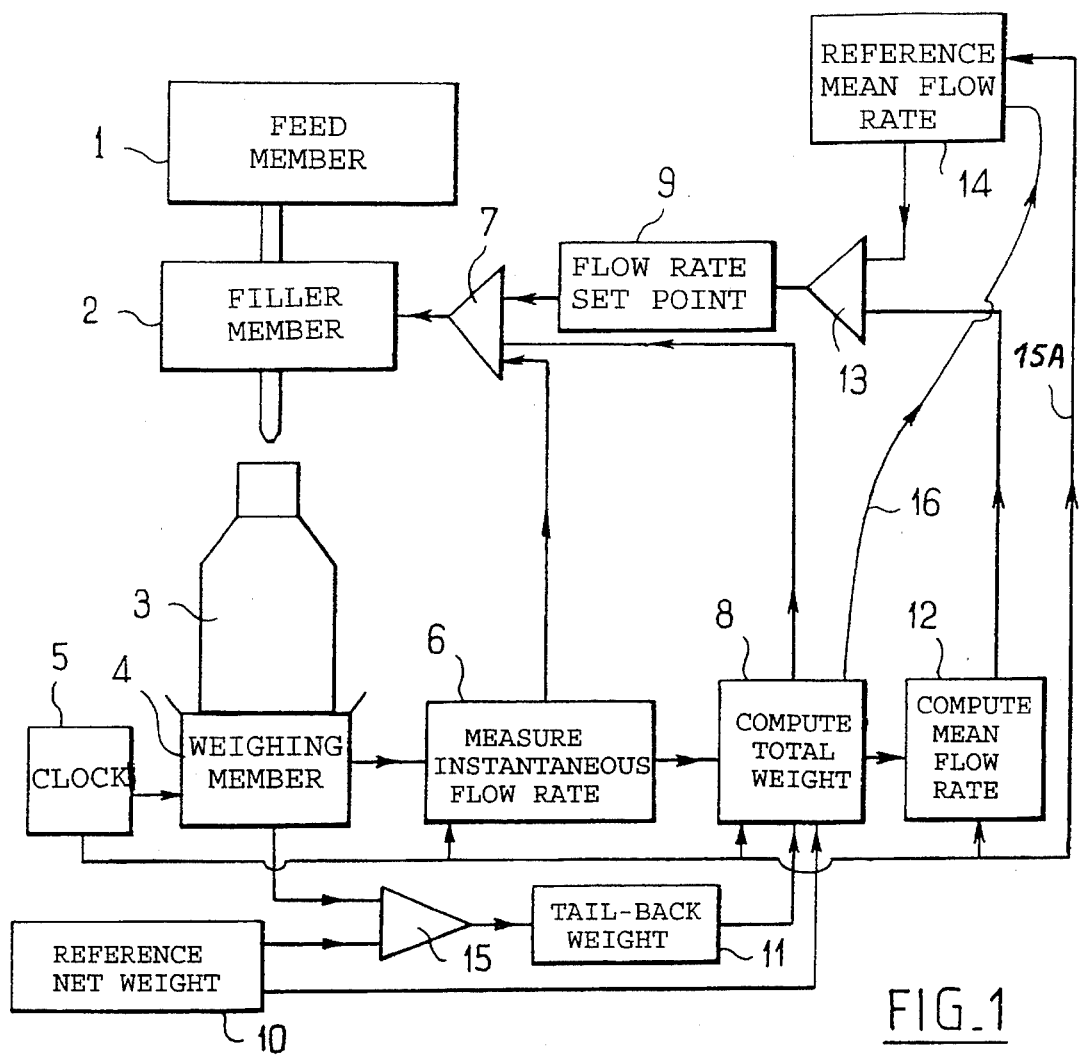
FIG_1
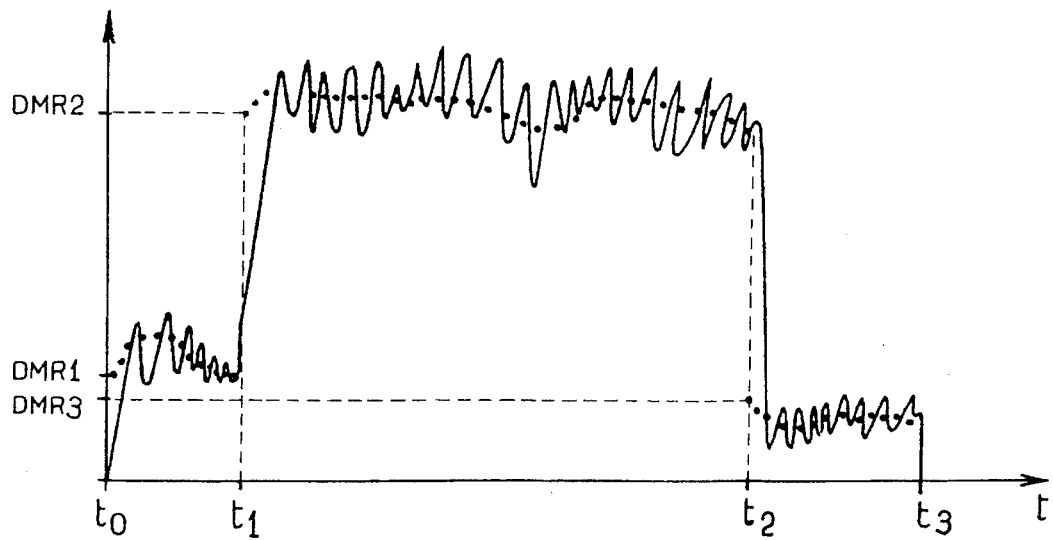
FIG_2

MEASURING WEIGHT BY INTEGRATING FLOW

The present invention relates to a method of filling a receptacle with a reference net weight of substance by using a filler mender disposed to fill the substance into the receptacle while the receptacle is being carried by a weighing member.

BACKGROUND OF THE INVENTION

Various methods are known for filling a receptacle with a net weight of substance. Traditionally, the simplest method has consisted in placing a receptacle on a weighing member, the receptacle itself being located beneath a filler member which is switched on and off under the control of the weighing member as a function of the apparent weight measured thereby. The apparent weight includes not only the weight of the receptacle and the net weight of substance contained in the receptacle, but also the force that results from the jet of substance striking the surface of substance already contained in the receptacle. This force varies not only as a function of the degree of opening of the filler member, but also as a function of the viscosity of the substance, which means that if the viscosity of the substance varies during filling, then the weight measurement performed by the weighing member is erroneous and the real net weight of substance filled into the receptacle at the end of weighing is not equal to the desired net weight of substance.

In addition, at the moment the filler member is switched off, the weight of substance extending between the filler member and the surface of the substance already in the receptacle, referred to as herein as the "tail-back" weight, is added to the weight of substance finally contained in the receptacle at the end of the filling cycle. The weight of the tail-back varies as a function of the diameter of the filler member orifice immediately prior to being turned off, and on the viscosity of the substance. In conventional methods, the pressure of the jet during filling and the weight of the tail-back must therefore be compensated so that in the end the desired reference net weight of substance is obtained in the receptacle.

French patent 2 679 516 discloses a filling method consisting in servo-controlling the flow rate of the substance to a reference flow rate, and in performing filling for a predetermined fixed length of time that is calculated in advance by dividing the reference net weight by the reference flow rate. That method makes it possible to eliminate the effects of the pressure of the jet on the surface of substance already contained in the receptacle by measuring the instantaneous flow rate over successive time intervals during which the force of the jet of substance on the surface of the substance already contained in the receptacle is assumed to remain constant. In theory, that method ought to be highly satisfactory, however, in practice, servo-controlling the flow rate to a reference flow rate does not make it possible to obtain a real flow rate that is exactly equal to the reference flow rate, and it is therefore necessary to perform compensation by checking the real net weight after filling and by modifying the parameters of the servo-control loop for subsequent filling cycles so that the real net weight becomes as close as possible to the reference net weight.

OBJECTS AND SUMMARY OF THE INVENTION

An object of the present invention is to provide a method of filling a receptacle with a reference net weight that is more accurate than prior methods.

To achieve this object, the present invention provides a method comprising the following steps:

controlling the flow of substance by means of the filler member;

measuring, over successive time intervals, the instantaneous flow rate of substance filled into the receptacle;

calculating the total weight of substance filled into the receptacle on the basis of the instantaneous flow rate over each time interval; and causing the flow of substance to stop when the calculated total weight reaches the reference net weight minus a tail-back weight for the substance.

Thus, when the instantaneous flow rate varies from one time interval to another, the effects of such variation are automatically taken into account when calculating the total weight of substance contained in the receptacle, such that the real net weight of substance contained in the receptacle after the filler member has been turned off is affected only by variations in the tail-back weight which are of little influence and which can be evaluated with very great accuracy.

In an advantageous version of the invention, the method also includes the following steps:

measuring a mean flow rate over a plurality of time intervals on the basis of the total weight computed over said time intervals;

comparing the computed mean flow rate with a reference mean flow rate;

deducing a flow rate set point therefrom; and controlling the filler member as a function of the flow rate set point.

Although filling time is not the parameter governing closure of the filler member, this ensures that a very regular filling time is obtained, thereby making it possible to reduce periods of "dead" time between filling cycles, and thus achieve a very high filling throughput.

According to another advantageous aspect of the invention, the method also includes the following steps:

comparing the instantaneous flow rate with a flow rate set point; and controlling the filler member as a function of the difference between the instantaneous flow rate and the flow rate set point.

This aspect of the invention also serves to regularize filling time and thus improve filling throughput by reducing periods of "dead" time between filling cycles.

BRIEF DESCRIPTION OF THE DRAWING

Other characteristics and advantages of the invention appear on reading the following description of a preferred implementation of the method of the invention and given with reference to the accompanying drawing, in which:

FIG. 1 is a block diagram showing the filling steps of the preferred implementation of the invention; and FIG. 2 is a graph showing flow rate during a filling cycle performed by the method of the invention.

MORE DETAILED DESCRIPTION

With reference to FIG. 1, the method of the invention is implemented by apparatus comprising, in conventional manner, a feed member 1 connected to a filler member 2 disposed above a receptacle 3, itself carried by a weighing member 4. The feed member may, for example, be a vessel carried by the rotary platform of a carousel or it may be a vessel separate from the carousel and connected to its platform via pipework that includes a rotary coupling. The flow from the feed member may be assisted by a centrifugal pump. The filler member 2 may, for example, be a variable-opening valve or an Archimedes' screw controlled at variable speed by a stepper motor, with the speed of the motor defining the flow rate driven by the Archimedes' screw, in particular for a substance that is semi-liquid such as mayonnaise or a substance that is not uniform such as a sauce with lumps. In this respect, it may be observed that the filler member cannot be controlled directly to take up a particular flow rate value, but only as a function of some physical parameter (flow section or speed of rotation of the screw), with the real flow rate depending not only on the controlled physical parameter, but also on other parameters such as the density of the substance, its viscosity, and the pressure in the feed duct.

The apparatus also includes a clock 5 for providing a common time base to the various members that implement the method of the invention.

In the preferred implementation of the invention, the weighing member is connected to a member 6 for measuring instantaneous flow rate, which member is connected to a control member 7 and to a computing member 8. For example, to measure the instantaneous flow rate, the signal from the weighing member 4 is sampled at very regular time intervals, e.g. at intervals of one-thousandth of a second, with the difference being taken between the signal sampled at a given instant and the signal sampled at the instant preceding it by one time interval, and with the difference then being divided by the duration of the time interval. This instantaneous flow rate measurement is applied firstly to the control member 7 that controls the filler member, and secondly to the computing member 8 that computes the total weight of substance contained in the receptacle. The control member 7 for controlling the filler member also receives a flow rate set point 9 with which the measured instantaneous flow rate is compared to deduce therefrom the control that should be applied to the filler member 2.

The member 8 for computing the total weight computes the weight increment of substance filled into the receptacle during each time interval by multiplying the instantaneous flow rate by the duration of the time interval, and by summing the weight increments in order to obtain the total net weight of substance contained in the receptacle. It may be observed that this computed total net weight differs from the signal provided by the weighing member, which signal is representative not only of the total net weight of substance contained in the receptacle, but also of the weight of the receptacle and of the force applied by the jet of substance on the free surface of substance already contained in the receptacle, these interfering elements being eliminated by the initial computation of the instantaneous flow rate. In practice, summing is performed by integrating the instantaneous flow rate signal as transmitted by the measuring member 6 to the computing member 8 and while using a time base that coincides with that used for measuring the instantaneous flow rate.

In addition, the computing member 8 receives a signal 10 representative of the reference net weight of substance that it is desired to fill into the receptacle, and a signal 11 representative of the tail-back weight that corresponds to the filling member in use and to the substance being packaged.

The computing member 8 compares the calculated total net weight with the difference between the reference net weight and the tail-back weight, and it applies an order to the control member 7 to stop the flow when these two terms are equal.

In the preferred implementation of the invention as shown, the member for computing the total weight also applies a signal representative of the weight of substance filled into the receptacle over a plurality of time intervals to a member 12 for computing mean flow rate, which member computes the mean flow rate over the time intervals in question by dividing the weights of substance filled into the receptacle over said time intervals by the duration of said time intervals, and it applies the resulting signal to a comparator member 13 which also receives a signal representative of the desired mean flow rate over said time intervals from a member 14 for applying the reference mean flow rate. The comparator member 13 determines the flow rate set point signal 9 by taking the difference between said reference mean flow rate and the computed mean flow rate, and by adding it to or subtracting it from the reference mean flow rate depending on whether the calculated mean flow rate is respectively less than or greater than the reference mean flow rate. The reference mean flow rate is itself calculated by dividing the reference net weight by the desired filling time. When filling is to take place in a plurality of steps, a mean flow rate is calculated for each step as a function of the net weight of substance that is to be filled during each step and as a function of the filling time desired for each step.

The tail-back weight is equal to the weight of the volume of substance that extends between the filler member and the surface of substance in the receptacle at the moment the flow is stopped. When the flow conditions and the density of the packaged substance are constant, it is possible to calculate the tail-back weight. However, when those values are irregular, it is preferable to measure the tail-back weight and to update it after each filling cycle. To this end, the invention provides for using the weighing member after the end of filling to measure the real net weight of substance filled in the receptacle. This real net weight is computed in conventional manner by subtracting the weight of the receptacle from the total weight measured by the weighing member, the weight of the receptacle having previously been stored if it is sufficiently constant, or else by measuring the weight of the empty receptacle prior to filling and then subtracting this measured weight continuously during filling. The signal representative of real net weight is applied to a comparator member 15 which compares the real net weight with the reference net weight 10, and by which deduces the tail-back weight therefrom by taking the difference between the reference net weight and the real net weight, and by adding it to or subtracting it from the previous tail-back weight depending respectively on whether the real net weight is less than or greater than the reference net weight. The initial value of the tail-back weight may either be evaluated theoretically as a function of flow conditions and of the nature of the substance being packaged, or else it may be measured by performing a first filling cycle during which the tail-back weight is artificially assumed to be zero, such that the flow is stopped when the total weight of substance as computed by the member 8 is equal to the reference net weight, and thus the real net weight as measured after filling is then greater than the reference net weight by a quantity which is equal to the tail-back weight.

FIG. 2 illustrates the method of the invention in the context of filling a receptacle with one kilogram of substance having relative density 1, the filling cycle comprising three filling stages. FIG. 2 shows how flow rate varies as a function of time. The continuous line represents the variations in instantaneous flow rate as a function of time, while the dashed lines represent variations in the flow rate set point as a function of time. Each filling cycle comprises a first stage running from instant $t_0$ to instant $t_1$, which stage takes place at a low flow rate so as to fill only a small quantity of substance in order to avoid forming any foam, with this stage being performed at a reference mean flow rate of 50 grams per second (g/s) for about 1 second. The second stage takes place from instant $t_1$ to instant $t_2$ and is intended to perform filling at a high flow rate that is as fast as possible, e.g. at a reference mean flow rate of 300 g/s for about 3 seconds. The third stage takes place from instant $t_2$ to instant $t_3$ and is intended to enable the flow to be stopped accurately. This third stage is therefore performed at low flow rate, e.g. 40 g/s for about 1 second, with the tail-back weight of a jet having a diameter of 12 mm and a length of 50 mm being about 5.6 grams.

It will be observed that the total duration of the cycle is given solely by way of indication since the instant at which the flow is stopped is determined by reference to the computed total weight and not by reference to a total cycle time. In contrast, switching from one stage of filling to another can be performed either at the end of a fixed length of time under the control of the clock 5, as illustrated by line 15A in FIG. 1, e.g. after 1 second for the first stage, or else once the computed total weight reaches an intermediate weight threshold as illustrated by line 16 in FIG. 1 running between the member for computing the total weight 8 and the member for applying the reference mean flow rate, e.g. 50 grams in the example described.

At the beginning of the filling cycle, the flow rate set point is equal to the reference mean flow rate. During each filling stage, the mean flow rate is computed from the beginning of said stage. In the example shown, filling therefore begins with a flow rate set point DMR1 equal to the first reference flow rate, i.e. 50 g/s. During the first time intervals, flow is being established so the computed mean flow rate is less than the reference mean flow rate and as a result the flow rate set point is progressively increased as illustrated by the dotted curve in FIG. 2. Once the delay that results from establishing flow has been caught up, the flow rate set point is progressively reduced to come close to the reference mean flow rate. The real curves for the instantaneous flow rate and the flow rate set point depend on the reaction speed of each of the servo-control loops. At instant $t_1$ corresponding to the end of the first filling stage, regardless of whether this is determined by a weight threshold or by a length of time fixed in advance, the reference mean flow rate is raised to the value DMR2, and the flow rate set point is also changed so that it takes up said value temporarily. As before, while the flow is becoming established at this higher flow rate, the computed mean flow rate is late relative to the reference mean flow rate so the flow rate set point begins by increasing relative to the reference mean flow rate. In this context, it should be observed that in the example shown, where the flow rate set point is servo-controlled to the reference mean flow rate, it suffices to modify the reference mean flow rate and the flow rate set point will track the modification one time interval later (one-thousandth of a second in the example given).

At instant $t_2$ which corresponds to the end of the second stage, the reference mean flow rate is taken to the value DMR3. Given the reaction inertia of the filler member, the beginning of the third filling stage tends to take place at a computed mean flow rate that is greater than the reference flow rate DMR3, and the flow rate set point therefore tends to drop below the reference mean flow rate, as shown in FIG. 2.

Instant $t_3$, which corresponds to the flow being stopped is determined solely by the computed total weight. The closer the instantaneous flow rate curves are to the straight lines corresponding to the reference mean flow rates, the closer this instant will be to the evaluation performed initially.

Naturally, the invention is not limited to the implementation of the method as described above, and variant implementations may be applied thereto without going beyond the ambit of the invention as defined by the claims.

In particular, although the method of the invention is described above with reference to a filling cycle that comprises three filling stages each having a constant reference mean flow rate, since the flow rate set point is servo-controlled as a function of the reference mean flow rate and of the computed mean flow rate, it is possible to cause the flow rate set point to vary continuously by progressively modifying the reference mean flow rate as a function of the calculated total weight. Such continuous variation of the flow rate is very useful when filling a receptacle of large dimensions since it makes it possible, in particular, to reduce the tail-back weight at the end of filling by reducing flow rate, with this being done by progressively reducing the reference mean flow rate down to some minimum reference mean flow rate that is reached very shortly before the filler member is closed. By way of example, when filling a 20 liter can with oil having a relative density of 0.9, i.e. with 18 kg of oil, the filling cycle may comprise a first stage during which 1 kg is filled at a reference mean flow rate of 1,000 g/s, i.e. during about 1 second, followed by a second stage during which 16 kg are filled at a reference mean flow rate of 2,000 g/s, i.e. during about 8 seconds, and a last stage during which the reference mean flow rate is decreased by 2 g/s each time the computed total weight increases by 2 g, down to a minimum reference mean flow rate of 50 g/s, i.e. over about 1 second, thereby leading to the flow being stopped with a tail-back weight of about 5 grams only. In this context, it will be also be observed that any sudden change of flow rate runs the risk of giving rise to hunting phenomena in the servo-control loops. To avoid such hunting, it is possible to average the control signals relative to the measurement signals. For example, although instantaneous flow rate is measured once every thousandth of a second, and although the total weight is also computed at the same frequency, it is possible to average instantaneous flow rate over one-hundredth of a second prior to performing the comparison with the flow rate set point as applied to the control member 7, thereby ensuring that commands are applied to the filler member only every hundredth of a second. It is important to ensure that the command signals are not applied at a frequency that is greater than frequency at which the filler member is physically capable of responding, particularly because of the inertia of the parts to be moved. To minimize hunting, it is also possible to modify the reference mean flow rate progressively on each change of stage.

Further, although the servo-control loops concerning instantaneous flow rate and establishing a flow rate set point are useful for obtaining a cycle time that is as regular as possible, it is possible in the context of the invention to omit these servo-control loops and to retain only stopping of the flow as a function of the computed total weight, the filler member then being controlled to operate at some constant value (i.e. to be opened to a constant section, or for an Archimedes' screw to rotate at a constant speed) during each filling stage. Under such circumstances, the instantaneous flow rate varies in random manner as a function of feed pressure and of the viscosity of the substance.

It is also possible to adopt an intermediate solution by servo-controlling only the instantaneous flow rate or only the flow rate set point. In the first case, the flow rate set point is constant but the instantaneous flow rate is servo-controlled to said flow rate set point and is therefore regular about said set point value.

In the second case, the flow rate set point is servo-controlled on the reference mean flow rate, but said flow rate set point is applied directly to the filler member to control the corresponding parameter (e.g. the flow section or the speed of rotation of the Archimedes' screw), such that although close to the flow rate set point, the instantaneous flow rate depends in random manner on flow conditions, in particular because of variations in feed pressure or in the viscosity of the substance.

I claim:

1. A method of filling receptacles with a substance to a reference net weight of said substance by means of a filler member disposed to fill the substance into the receptacle while the receptacle is being carried by a weighing member which measures a force including a weight of said receptacle, a net weight of said substance in said receptacle and a force applied by flow of said substance against a surface of said substance in said receptacle, and compensating for a tail-back weight equal to an amount of said substance discharged from said filler member into said receptacle after flow therefrom is stopped, the method comprising the following steps:

forwarding previously calculated information concerning the tail-back weight of a first receptacle corresponding to said filler member and said substance;

controlling the flow of said substance into a subsequently filled second receptacle by means of the filler member;

measuring, over successive time intervals, the instantaneous flow rate of said substance filled into the second receptacle;

calculating a total weight of said substance filled into the second receptacle by calculating a weight increment of said substance from said filler member over one said time interval by multiplying; the instantaneous flow rate over said one time interval by said time interval and summing the calculated weight increments over all said time intervals; and causing the flow of substance to stop when the calculated total weight reaches the reference net weight minus said calculated tail-back weight for the substance.

2. A method of filling according to claim 1, further including the following steps:

measuring a mean flow rate over a plurality of time intervals on the basis of the total weight computed over said time intervals;

comparing the computed mean flow rate with a reference mean flow rate;

deducing a flow rate set point therefrom; and controlling the filler member as a function of the flow rate set point.

3. A method according to claim 2, wherein, towards the end of filling, the reference mean flow rate is progressively reduced as a function of the computed total weight and down to a minimum reference mean flow rate.

4. A method of filling according to claim 2, wherein the reference mean flow rate is computed by dividing the reference net weight by the desired filling time.

5. A method of filling according to claim 4, including a plurality of filling stages, wherein the reference mean flow rate is computed for each stage as a function of the net weight of substance that ought to be filled during each stage and as a function of the desired filling time for each stage.

6. A method of filling according to claim 1, further including the following steps:

comparing the instantaneous flow rate with a flow rate set point; and controlling the filler member as a function of the difference between the instantaneous flow rate and the flow rate set point.

7. A method of filling according to claim 1, wherein the weight of the tail-back is determined by comparing the reference net weight with the real net weight as measured by the weighing member after filling.

* * * * *